March 13, 1934.  O. CARLSON  1,950,711
CUFF LINK
Filed April 7, 1933
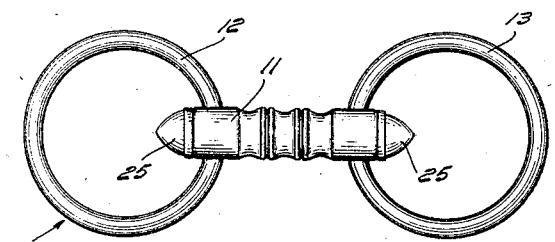
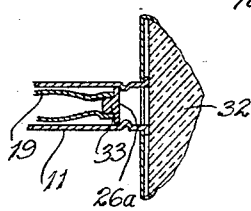
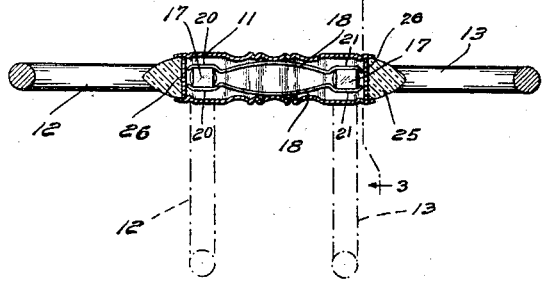
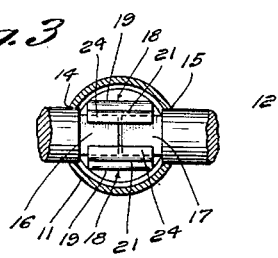
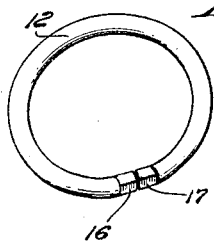
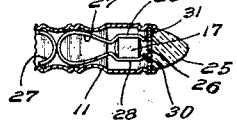
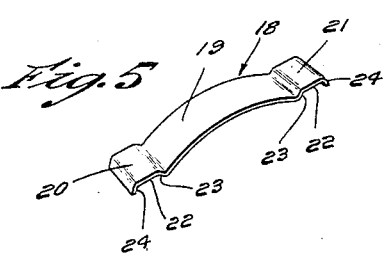
Inventor
Oscar Carlson
By Nathaniel Frucht
his Attorney Patented Mar. 13, 1934

1,950,711

UNITED STATES PATENT OFFICE 1,950,711

CUFF LINK

Oscar Carlson, East Providence, R. I., assignor to Dolan & Bullock, Providence, R. I., a partnership composed of Arthur S. Dolan, Frederick A. Bullock and William G. Bennett Application April 7, 1933, Serial No. 664,878

15 Claims. (Cl. 24—102)

My present invention relates to cuff-links, and has particular reference to the construction of cuff links having movable ends or heads.

Cuff links have been devised with heads which may be alternatively moved into the plane of the cuff link body in order to facilitate insertion into the cuffs of a shirt or the like, and then into a position at right angles to the plane of the link body to retain the link in the garment. It has been found difficult, however, to provide a cuff link construction which will securely lock the heads in place in the different positions, and which will not exert an undesirable wearing action on the engaging parts. It is the principal object of my invention to provide a construction that will permit the desired head movement, that will securely hold the head in its alternative positions, and that will substantially eliminate wear and tear of the moving parts.

To this end, I have devised a spring arrangement which is housed in the link body and which grips selected pivotal parts of the heads to exert spring pressure against change of movement of the heads, the cooperating parts being designed to reduce wear of the pivotal head parts and to prevent wearing contact of the moving parts with the link body.

With the above and other objects and advantageous features in view, the novel invention comprises a cuff link construction more fully disclosed in the appended detailed description, considered in conjunction with the accompanying drawing, and more specifically defined in the claims appended thereto.

In the drawing:

Fig. 1 is a plan view of an assembled cuff link;

Fig. 2 is a central sectional view of Fig. 1;

Fig. 3 is an enlarged detail of one end, the stone being removed;

Fig. 4 is a perspective view of one head,

Fig. 5 is a perspective view of one spring element;

Fig. 6 is a section, partly broken away, of a modified construction; and

Fig. 7 is a perspective view of a modified form suitable for a fixed end ornament.

Referring to the drawing, the cuff link 10 is preferably shown as of the bit link type, and comprises a central tubular barrel 11 and two ring type split heads 12, 13. The barrel, which may be of any external design, has aligned openings 14, 15 adjacent the ends thereof into which the square ends 16, 17 of the heads are received, these square ends forming a square pivot section for each head.

Within the barrel are positioned two springs 18, see Fig. 5, each having an arcuate central portion 19 and end sections 20, 21, these end sections being formed or indented to provide seats 22 for engaging selected faces of the square ends of the heads and edges 23, 24 for engaging the sides of the square ends contiguous to the selected faces.

The assembly is completed by stones 25, which close the ends of the barrel and separation plates 26 which close the center portion of the barrel and support the stones, the latter being retained in place by curling the ends of the barrel over their bases. The square ends of the heads are thus firmly held between the spaced ends of the springs, and the arcuate spring centers press against the inner wall of the barrel.

The separation plates 26 thus function as closures for the operating mechanism, and prevent longitudinal movement of the springs, and also act as supports for the stones, thus permitting greater latitude in the sizing and shape of the stones. While it is preferred to use flat plates, other constructions may be utilized; for example, the separation plates may be formed as gem mountings, the ends of the barrel being curled over or otherwise locked to the separation plates to lock the parts together.

It may be desirable in certain constructions to utilize U-shaped springs instead, such as disclosed in Fig. 6; the springs 27 are formed to provide spaced ends 28 adapted to contact the upper and lower faces of the square end of the head, edges 30, 31 being preferably provided to engage the side faces of the square end.

When the heads are turned, the spring ends give enough to permit rotation, but the edges prevent lateral displacement of the square ends of the heads and thus prevent wearing contact of the head parts with the edges of the barrel openings. Moreover, the wide sides of the square ends of the head limit wear, and ensure a long and effective life of the cuff link parts, thus permitting use of soft metal for the barrel and the heads.

If desired, one spring may be used instead of two, as the spring cannot shift to release the head ends. It is preferred, however, to use two springs, and thus increase the locking action on the head ends. Moreover, it may be preferable, see Fig. 7, in certain constructions, to use an ornament 32 such as a button or a large stone to replace one head, the button or stone being locked against movement relative to the barrel if desired as by riveting the button or the stone holder to the barrel end. In this arrangement, the separation plate 26a adjacent the ornament may be formed with a protuberance 33 to replace one square end, instead of changing the construction of the springs to compensate for the replaced head.

While I have described a specific constructional embodiment of my invention, it is obvious that desired changes in the shape, in the material, and in the relative arrangement of the parts, may be made to suit the public taste for cuff links, without departing from the spirit and the scope of the invention as defined in the appended claims.

I claim:—

1. In a cuff link, a tubular barrel, a head having a square section and journalled in opposite sides of the barrel, and a spring mounted in said barrel and having the center portion thereof fulcrumed against the inner surface of the barrel and one end thereof engaging a selected side of the square section for locking the head in selected position.

2. In a cuff link, a tubular barrel, a head having a square section and journalled in opposite sides of the barrel, and a pair of spaced springs mounted in said barrel each having the center portion fulcrumed against the inner surface of the barrel and one end engaging a selected side of the square section for locking the head in selected position.

3. In a cuff link, a tubular barrel, a head having a square section and journalled in opposite sides of the barrel, and a spring mounted in said barrel and having one part thereof fulcrumed against the inner surface of the barrel and one end thereof engaging a selected side of the square section for locking the head in selected position, said end having edges engageable with the sides of the square section which are contiguous to the selected side.

4. In a cuff link, a tubular barrel, a head having a square section and journalled in opposite sides of the barrel, and a pair of spaced springs mounted in said barrel each having one part thereof fulcrumed against the inner surface of the barrel and one end thereof engaging a selected side of the square section for locking the head in selected position, said spring ends having edges engageable with the sides of the square section contiguous to the selected sides.

5. In a cuff link, a tubular barrel, heads at the ends of the barrel each having a square section journalled in opposite sides of the barrel, and spring means mounted in the barrel directly engageable with selected sides of the square sections for locking the heads in different selected positions, said spring means also engaging the sides of the square sections which are contiguous to the selected sides.

6. A spring for a cuff link having an arcuate center portion and substantially flat end portions, said end portions having side edges.

7. A spring for a cuff link of generally U-shape, the sides of the U having substantially flat parallel end portions, said end portions having side edges.

8. In a cuff link, a barrel having an open end to receive an ornament or the like, and an ornament support member seated in said open end.

9. In a cuff link, a tubular barrel adapted to receive ornaments in the open ends thereof, and ornament support members seated in the open ends of the barrel.

10. In a cuff link, a tubular barrel, a head having a square section and journalled in opposite sides of the barrel, and a spring mounted in said barrel and having the center portion thereof fulcrumed against the inner surface of the barrel and one end thereof engaging a selected side of the square section for locking the head in selected position, said end having edges engageable with the sides of the square section which are contiguous to the selected side.

11. In a cuff link, a tubular barrel, a head having a square section and journalled in opposite sides of the barrel, and a pair of spaced springs mounted in said barrel each having the center portion thereof fulcrumed against the inner surface of the barrel and one end thereof engaging a selected side of the square section for locking the head in selected position, said spring ends having edges engageable with the sides of the square section contiguous to the selected sides.

12. In a cuff link, a tubular barrel, a head pivotally mounted at one end thereof and selectively movable to different positions relative to said barrel, and an ornament member locked to said barrel at the other end thereof and extending laterally therefrom.

13. In a cuff link, a barrel having tubular ends, a head having a portion pivotally mounted in said barrel adjacent one end, means in said barrel for selectively retaining said head parallel to and perpendicular to said barrel, and an ornament member locked to the other end of said barrel and extending laterally therefrom.

14. A spring for a cuff link having an arcuate portion, an end of the arcuate portion being bent transversely and then outwardly to provide a substantially flat end portion joined to the arcuate portion and offset laterally therefrom.

15. A spring for a cuff link of generally U-shape, the ends of the U being bent transversely and then outwardly to provide substantially flat parallel end portions joined to the sides and offset laterally therefrom.

OSCAR CARLSON.